Patented Mar. 16, 1948

2,437,930

UNITED STATES PATENT OFFICE 2,437,930

PRODUCTION AND RECOVERY OF OLEFIN OXIDES

Ingolfur Bergsteinsson, Billings, Mont., and James R. Scheibli, Oakland, Calif., assignors to Shell Development Company, San Francisco, Calif., a corporation of Delaware No Drawing. Application August 28, 1943, Serial No. 500,456

6 Claims. (Cl. 260—348.5)

This invention relates to the production of olefin oxides, and more particularly pertains to a highly efficient and economical process for the commercial scale production of olefin oxides, particularly ethylene oxide, by the direct catalytic oxidation of the corresponding olefin, and for the recovery of the olefin oxides from the resulting reaction mixture. More specifically, the invention provides a procedure for materially prolonging the life and efficiency of the catalyst employed in such direct catalytic oxidation of olefins to the corresponding olefin oxides.

Numerous processes have been proposed for preparing olefin oxides by reacting olefins with oxygen at elevated temperatures in the presence of a suitable catalyst. In accordance with these known processes, the oxidation has been effected in the presence of a catalyst, particularly a silver metal catalyst, which is in either the massive form or in a finely divided state. Silver metal catalysts in massive form which have been suggested for use in the oxidation of olefins to olefin oxides have included silver leaf, silver sponge, silver mesh, silver pellets and other forms of massive proportions. The finely divided silver catalysts used in these processes have been prepared by methods such as, for example, the thermal decomposition of a decomposable silver compound in a reducing or inert medium or the precipitation of metallic silver from solutions or suspensions of silver compounds. Finally divided silver has been deposited in this manner upon suitable carrier or support materials, such as diatomaceous earth, fuller's earth, selected clays, pumice, silica, silicon carbide, alumina, carbon, magnesium oxide, crushed firebrick, bauxite, marble, Pyrex glass, sandstone, majolica, artificial and natural zeolites, and metal oxide gel-type materials comprising the oxides of chromium, molybdenum, tungsten, and the like. Particularly efficient and desirable silver catalysts for use in the direct catalytic oxidation of olefins to olefin oxides are the silver catalysts prepared in accordance with the process disclosed in the copending applications Serial No. 498,428, filed August 11, 1943, now Patent 2,424,083, and Serial No. 498,430, filed August 11, 1943, now Patent 2,424,085.

Although numerous methods for effecting the catalytic combination of olefins with oxygen to form olefin oxides have been described, the prior art methods have not proved to be wholly satisfactory largely because the catalysts used are readily poisoned by substances formed as by-products during the oxidative process. Furthermore, the known methods have not provided suitable and efficient means for extracting the olefin oxide as such from the complex reaction mixture resulting from the aforesaid catalytic oxidation and containing, besides the olefin oxide, unreacted olefin, excess oxygen or air, gaseous decomposition products, etc. It is common practice to absorb the olefin oxide product in an aqueous acid solution, such as a water solution of sulfuric acid or hydrochloric acid, or in an aqueous acid solution containing a dissolved salt, such as hydrochloric acid containing dissolved magnesium chloride. Acid treatment of the olefin oxide converts the oxide, however, to the corresponding glycol which is then isolated and does not result in the isolation of the olefin oxide, which may be the desired product in many instances. It has also been suggested that the olefin oxide be separated from the reaction mixture by selectively absorbing it on an absorbing medium such as charcoal and then recovering the olefin oxide by suitable means, as by steaming. Although this method results in the isolation of the desired olefin oxide rather than of the corresponding glycol, it is a relatively expensive method and is obviously not suitable for commercial application on a large scale.

An additional defect in the processes of the prior art for effecting the catalytic combination of olefins with oxygen to form olefin oxides resides in the failure of the known processes to provide an effective method for preventing poisoning of the catalysts. When feed stocks comprising a pure olefin or a mixture of pure olefins are subjected to catalytic oxidation, poisoning difficulties are encountered to only a very minor and usually inconsequential extent. However, when the feed stocks contain as little as from 1% to 2% of paraffin hydrocarbons, catalyst poisons are formed to an appreciable extent, presumably by the oxidation of the paraffin hydrocarbon content of the feed to acid substances capable of combining or reacting with the catalyst. The silver catalysts which are especially effective in promoting the oxidation of olefins to olefin oxides are particularly sensitive to poisoning by catalyst poisons of this type and are rendered ineffective after relatively short periods of operation with feeds containing paraffin hydrocarbon impurities. This is particularly true when, as is often the case in order to obtain high yields of olefin oxide, all or part of the exit gases from the catalyst chamber are recycled over the same catalyst or are passed into reaction chambers containing additional quantities of catalyst. Such further treatment of the partially converted olefins serves to build up the concentration of catalyst poisons so that, if provision is not made for their removal, their concentration soon reaches the point where it seriously interferes with the operation of the catalytic process by materially decreasing the activity of the catalyst, thereby necessitating shutdowns at frequent intervals in order to regenerate or renew the catalyst. Since the commercially available olefins contain appreciable amounts (i. e. from about 2% to about 80%) of saturated hydrocarbons as impurities and since complete removal of the saturated hydrocarbons from the desired olefins is a difficult and expensive process, it would be of value to provide a process for the commercial production of olefin oxides by the oxidation of commercially available olefins over a suitable catalyst wherein provision is made for preventing the poisoning of the said catalyst.

It is an object of the present invention to avoid the above and other defects of the prior art. It is another object to provide a process of increased efficiency, economy and facility of operation for the conversion of olefins to olefin oxides wherein the olefin oxide is extracted from the reaction products economically and with a high degree of efficiency and is recovered as such rather than in the form of the corresponding glycol. It is a further object to provide a method for the commercial production of olefin oxides by the oxidation of olefins over a suitable catalyst which process includes means for preventing poisoning of the catalyst. It is still another object to provide a commercial method for the production of olefin oxides by the catalytic oxidation of olefins in which commercially available olefins may be used without the necessity of employing costly preliminary treatments to separate therefrom the saturated paraffin hydrocarbons present therein.

It has now been discovered that the above and other objects may be attained by using a lower aliphatic monohydric alcohol to selectively extract the olefin oxides together with the catalyst poisons contained in the reaction product resulting from the catalytic oxidation of olefins or olefin-containing gases with oxygen. More fully stated, the present invention is predicated on the discovery that the above-mentioned and hereinbelow more fully described lower aliphatic monohydric alcohols are efficient and economic selective solvents for the olefin oxides and also possess selective characteristics for the mentioned catalyst-poisoning by-products which are apparently formed as a result of the oxidation of the paraffinic hydrocarbons present in the starting materials subjected to the catalytic oxidation reaction.

Broadly stated, the process of the present invention, therefore, resides in reacting an olefin or an olefin-containing gas with oxygen or an oxygen-containing gas at elevated temperatures and in the presence of a suitable oxidation catalyst, and separating the resulting olefin oxide from the reaction mixture by selective extraction of the former with a lower aliphatic monohydric alcohol which, under the conditions employed, has been found to be also effective in removing any catalyst poisons which may be present in the said reaction mixture, thereby making possible the passage of the unreacted olefins present over the same or a further quantity of catalyst in order to increase the over-all yield of olefin oxide produced and to increase the efficiency by removing the catalyst poisons and thus lengthening catalyst life and increasing the yield of olefin oxides. More specifically stated, high yields of olefin oxides may be produced and separated in accordance with the process of the present invention by reacting an olefin such as ethylene or a gas containing ethylene with oxygen or an oxygen-containing gas such as air at temperatures of between about 200° C. and about 360° C. and in the presence of a catalyst, preferably a silver metal catalyst containing or comprising silver metal and a suitable support material, separating the olefin oxide together with any catalyst poisons present in the reaction mixture by contacting said reaction products with a solvent comprising or consisting of a lower aliphatic monohydric alcohol, and passing the undissolved unreacted olefins over the same or another batch of catalyst in order to increase the over-all yield of olefin oxide produced. The desired olefin oxide may be separated from the mixture of the lower aliphatic alcohol, olefin oxide and catalyst poisons, for example, by heating or distilling the said mixture to drive off the olefin oxide.

In a preferred embodiment of the invention a stream of commercial ethylene containing from about 2% to about 80% of paraffin hydrocarbons and admixed with from about five volumes to about ten volumes of air may be passed continuously over a silver catalyst, e. g. a silver-on-alundum catalyst or a catalyst comprising silver-on-silicon and/or silicon carbide as described in the aforementioned co-pending applications Serial No. 498,428, filed August 11, 1943, and Serial No. 498,430, filed August 11, 1943. The temperature in the reaction chamber may be maintined preferably at from about 200° C. to about 360° C. The exit gases leaving the reaction chamber wherein the ethylene is catalytically oxidized to ethylene oxide may then be preferably cooled and contacted with a quantity of methyl alcohol contained in or sprayed through a suitable absorption apparatus which is kept at a temperature of about —20° C. to promote thorough and selective solution of the olefin oxide and substantially complete removal of the catalyst poisons. The resulting solution may then be withdrawn continuously or intermittently, and then heated to drive off the olefin oxide. The methyl alcohol solvent which contains small amounts of impurities including small amounts of catalyst poisons from contact with the said exit gases may then be returned to the absorption chamber with or without prior purification to remove said impurities. Since the exit gases still contain some unreacted ethylene, it is desirable to contact them with a further quantity of catalyst in another reaction chamber or to recycle these gases back to the original reaction chamber in order to obtain increased over-all yields of ethylene oxide. Such recycling may be accomplished by continuously or intermittently withdrawing and purging a portion of the exit gas and circulating the remainder back to the reaction chamber after adding the desired or optimum amounts of fresh olefin or olefin-containing gas and of oxygen or oxygen-containing gas to make up the desired feed.

When carrying out the oxidation of olefins to olefin oxides in accordance with the method described herein, it is thus possible to operate continuously and with increased efficiency for long periods of time, i. e. for periods of several hundred hours, without shutting down to replace or regenerate the catalyst. It is also possible to obtain and separate greatly increased yields of olefin oxides which are recovered in a relatively pure state without the necessity of converting them to the corresponding glycols, as by reaction with the absorption medium. It has been found possible, for example, to recover over 95% of the ethylene oxide resulting from the catalytic oxidation of ethylene with air over a silver-on-alundum catalyst by contacting the gases leaving the reaction chamber with cold methyl alcohol. This high recovery of ethylene oxide is made possible by the high selective solubility of the olefin oxides in the lower aliphatic monohydric alcohols, together with the low solubility of the unreacted olefins and paraffin hydrocarbons contained in the exit gases along with the olefin oxide, which unreacted olefins may then be further treated to secure increased yields of the desired oxide; by the ease with which the olefin oxide may be separated from the alcohol solutions; and by the removal in the solvent of the catalyst poisons which would otherwise destroy the activity of the catalyst and render it ineffective in a relatively short period of time. The olefin oxide obtained by the process described is obtained in a high degree of purity and is sufficiently pure to be used in almost any commercial or laboratory application without purification or other subsequent treatment. The operating expense is low because the apparatus required is relatively simple, the yields of olefin oxide are high, the alcohol solvent may be almost completely and quantitatively recovered, and the catalyst life is comparatively very long. The process is, furthermore, easily carried out and may be adapted to the efficient and economical utilization of a wide variety of feed stocks and to the production of a wide variety of olefin oxides.

Olefins capable of being catalytically oxidized to the corresponding olefin oxides in accordance with the process of the present invention comprise the normally gaseous as well as the readily volatile normally liquid hydrocarbons such as, for example, ethylene, propylene, the butylenes, the amplenes, and their homologues and suitable substitution products. The olefins may be employed severally or as mixtures containing a plurality of such olefins. Mixtures of olefins and paraffins may also be employed without resorting to the separation of the olefin or olefins therefrom prior to their use in the oxidation process. The olefins or olefin-containing mixtures may be obtained from any suitable source as, for example, from any petroleum refining operations such as the distillation, thermal cracking, hydrogenation, dehydrogenation, polymerization, etc. of hydrocarbon fluids, or they may be obtained from the processes of the natural gas industry. Varying ratios of oxygen to olefin may be used, depending upon the conditions under which the oxidation is effected. It is preferred, however, to use from one to two times the theoretical amount necessary to combine with the olefins present in the reaction zone. The oxygen may be introduced as free oxygen or in admixture with other gaseous materials such as air, steam, nitrogen, carbon dioxide, etc. If desired, the free oxygen may be liberated or formed from oxygen-containing substances during the operation of the process.

The catalytic oxidation of olefins to the corresponding olefin oxides may be carried out at any suitable temperatures in the broad range of from about 100° C. to about 500° C. Usually, however, reaction temperatures of from about 200° C. to about 360° C. are suitable and preferred. Any suitable means may be used to supply heat to the reactants or to the reaction zone, or to withdraw excess heat therefrom during the course of the reaction.

It is preferred to carry out the oxidation at about atmospheric pressure. However, subatmospheric or superatmospheric pressures may be used if desired. The optimum pressure, like the optimum temperature, will be determined by the conditions of operation and the nature of the olefin or olefin-containing mixture being oxidized.

Although because of the high solubility of the olefin oxides therein and for the other reasons stated hereinabove, it is preferred to use methyl alcohol or aqueous solutions of methyl alcohol as selective solvents for the olefin oxide formed by the catalytic oxidation of an olefin in accordance with the process of the invention, any of the lower saturated or unsaturated aliphatic monohydric alcohols, e. g. ethyl alcohol, propyl alcohol, isopropyl alcohol, the butyl alcohols, allyl alcohol, methallyl alcohol, crotyl alcohol, propargyl alcohol, etc., or mixtures or aqueous solutions thereof, may be used. In general, the saturated aliphatic monohydric alcohols containing not more than four carbon atoms are preferred. The olefin oxide may be contacted with the alcohol solvent by any suitable means, as by passing the exit stream of gases, with or without prior cooling, directly through a quantity of the alcohol solvent contained in a suitable apparatus. Alternatively, the alcohol solvent may be sprayed through a packed absorption tower countercurrently to the olefin oxide-containing stream of gases leaving the reaction chamber. The olefin oxide may be readily separated from the alcohol solvent in which it is dissolved in the absorber by continuously or intermittently withdrawing a portion of the solution of alcohol and olefin oxide, heating it or distilling it under diminished pressure, if desired, to separate the olefin oxide from the alcohol, and returning the alcohol to the absorption zone. It is of importance in both the absorption step and in the step of separating the olefin oxide from the alcohol solvent that the operating conditions be regulated so as to prevent the olefin oxide from reacting with the alcohol. This undesired reaction is favored or promoted by (1) high temperature, (2) increased pressure, (3) prolonged reaction time, and (4) the presence of certain catalysts such as sulfuric acid and some salts such as boron trifluoride or certain acid hydrosilicates. It follows, therefore, that these conditions must be avoided in carrying out the absorption and separation steps in the present invention. Since the absorption of the olefin oxide by the lower aliphatic monohydric alcohol is preferably carried out at quite low temperatures, e. g. at temperatures of the order of about −20° C. to about 0° C., at atmospheric or subatmospheric pressure or less, in a relatively short period of time, and in the absence of catalysts likely to promote the reaction between the alcohol and olefin oxide, there is little possibility that the stated undesired side reaction will take place in the absorber. Furthermore, the reaction will not take place during the heating or distillation step by which the olefin oxide is separated from the alcohol solvent if conditions are properly regulated, i. e. if the heating period is of a relatively short duration and the temperature employed is insufficient to cause the reaction. It is also desirable to use a lower aliphatic monohydric alcohol for this same reason, namely, that the boiling point of the lower alcohols is low enough so that the alcohol may be distilled off at a relatively low temperature.

The following example is illustrative of a specific method of carrying out the process of the present invention.

*Example*

Metered quantities of air, recycled gases (obtained as described hereinbelow) and commercial ethylene were fed continuously into a catalyst tube contained in an electrically heated vertical furnace capable of being controlled to ±4° C. by means of adjustable transformers. The catalyst used was a silver-on-alundum catalyst, while the rate of flow was one volume per minute of ethylene, 10 volumes per minute of air, and 33 volumes per minute of recycled gases. This resulted in a contact time of about 25 seconds. The operating temperature was maintained at about 320° C., the catalyst and furnace being brought to this temperature before beginning the run by preheating the furnace while circulating a current of air through the catalyst tube. The gases leaving the furnace were passed into a scrubber containing methyl alcohol maintained at a temperature of about —20° C. This effected the absorption of the ethylene oxide and the removal of the small amounts of catalyst poisons present in the reaction products. The undissolved gases comprising unreacted ethylene together with the saturated paraffin hydrocarbons present in the original feed constituted the aforementioned recycle gases, and were recycled to the catalyst tube after purging a portion and adding sufficient air and ethylene to maintain the desired ratio of 1 volume per minute of ethylene to 10 volumes per minute of air to 33 volumes per minute of the recycled gas. Analysis of the gaseous reaction product showed that over 95% of the ethylene oxide produced together with substantially all of the catalyst poisons had been removed by the treatment with methyl alcohol.

As will be apparent to one skilled in the art, the separation of olefin oxides from gaseous mixtures containing the same by the process disclosed herein, i. e. by absorption in a solvent comprising the lower aliphatic alcohols or mixtures or aqueous solutions thereof, may be advantageously applied to any process for the production of olefin oxides wherein the olefin oxide is produced as a component of a gaseous mixture and it is desired to separate the said olefin oxide from the other components of the mixture. The process of the invention may be applied with particular advantage, however, to catalytic processes such as the synthesis of olefin oxides by the oxidation of olefins with oxygen or an oxygen-containing gas over a silver catalyst by the process disclosed in the co-pending applications Serial No. 498,429, filed August 11, 1943, now Patent 2,424,084, and Serial No. 498,431, filed August 11, 1943, now Patent 2,424,086, since, as disclosed hereinabove, the present method provides an effective means for increasing the catalyst life by removing catalyst poisons from the reaction product and thereby permitting recycling of the unreacted olefins contained therein with resultant increased over-all yields, as well as for separating the desired olefin oxide in a relatively pure state.

We claim as our invention:

1. A continuous process for preparing ethylene oxide which comprises continuously subjecting an ethylene fraction containing ethylene and paraffin hydrocarbons to the action of oxygen at a temperature of between about 200° C. and about 360° C. in a reaction zone containing a silver catalyst prepared by reducing an ammoniacal silver solution in the presence of a silicon carbide support material, thereby forming a reaction mixture comprising ethylene oxide, unreacted ethylene, paraffin hydrocarbons, oxygen and relatively minor amounts of by-products capable of poisoning the catalyst, continuously withdrawing said reaction mixture from the reaction zone and continuously contacting it with methyl alcohol at a temperature of from about —20° C. to about 0° C. and under conditions substantially inhibiting any reaction between the ethylene oxide and the methyl alcohol, thereby selectively extracting the ethylene oxide and the said undesirable by-products, distilling the resulting methyl alcohol solution to separate the ethylene oxide therefrom, and recycling that portion of the reaction mixture which does not dissolve in the methyl alcohol solvent to the reaction zone for further oxidation of the ethylene present to ethylene oxide, thereby increasing the yield of ethylene oxide and materially prolonging the catalyst life due to the removal of the undesirable by-products which are capable of poisoning the catalyst.

2. A method for preparing olefin oxides which comprises reacting a technical mixture comprising an olefin and at least one paraffin hydrocarbon with oxygen at a temperature of between about 100° C. and about 500° C. in the presence of an oxidation promoting catalyst, thereby forming a reaction mixture comprising an olefin oxide, unreacted olefin, at least one paraffin hydrocarbon, oxygen and relatively minor amounts of by-products capable of poisoning the catalyst, contacting the said reaction mixture with a lower aliphatic alcohol under conditions such as to inhibit any reaction between the olefin oxide and the lower aliphatic alcohol, thereby selectively extracting therefrom the olefin oxide and the said undesirable by-products and recycling the undissolved portion of the said reaction mixture to the reaction zone for further oxidation of the olefin present to the corresponding olefin oxide, thereby increasing the yield of olefin oxide and materially prolonging the life of the catalyst due to the removal of the said undesirable by-products.

3. In a process for the production of ethylene oxide wherein normally gaseous hydrocarbons comprising ethylene and paraffins are contacted with an oxygen-containing gas in the presence of an active silver catalyst under conditions effecting the direct catalytic oxidation of ethylene to ethylene oxide with the formation of reaction products comprising ethylene oxide, ethylene, paraffins, oxygen and catalyst poisoning impurities, the steps which comprise contacting said reaction products with methyl alcohol in a scrubbing zone at a temperature of from about —20° C. to about 0° C. and under conditions inhibiting any substantial reaction between ethylene oxide and methyl alcohol, thereby extracting ethylene oxide and catalyst poisoning impurities from said reaction products in said scrubbing zone, withdrawing liquid comprising methyl alcohol containing dissolved ethylene oxide and catalyst poisoning impurities from said scrubbing zone, and passing normally gaseous materials comprising ethylene, paraffins and oxygen, free of any substantial amount of catalyst poisoning impurities, from said scrubbing zone to said reaction zone, thereby increasing the yield of ethylene oxide and materially prolonging the life of the catalyst due to the removal of catalyst poisoning impurities from the system.

4. In a process for the production of olefin oxide wherein an olefin in admixture with paraffins is contacted with an oxygen-containing gas in the presence of an active silver catalyst under conditions effecting the direct catalytic oxidation of said olefin to olefin oxide with the formation of reaction products comprising olefin oxide, olefin, paraffins, oxygen and catalyst poisoning impurities, the steps which comprise contacting said reaction products with methyl alcohol in a scrubbing zone at a temperature of from about −20° C. to about 0° C. and under conditions inhibiting any substantial reaction between olefin oxide and methyl alcohol, thereby extracting olefin oxide and catalyst poisoning impurities from said reaction products in said scrubbing zone, withdrawing liquid comprising methyl alcohol containing dissolved olefin oxide and catalyst poisoning impurities from said scrubbing zone, and passing scrubbed residual products comprising olefin, paraffins and oxygen, free of any substantial amount of catalyst poisoning impurities, from said scrubbing zone to said reaction zone, thereby increasing the yield of said olefin oxide and materially prolonging the life of the catalyst due to the removal of catalyst poisoning impurities from the system.

5. In a process for the production of ethylene oxide wherein normally gaseous hydrocarbons comprising ethylene and paraffins are contacted with an oxygen-containing gas in the presence of an oxidation catalyst at a temperature of from about 100° C. to about 500° C., thereby effecting the direct catalytic oxidation of ethylene to ethylene oxide with the formation of reaction products comprising ethylene oxide, ethylene, paraffins, oxygen and catalyst-poisoning impurities, the steps which comprise contacting said reaction products with methyl alcohol in a scrubbing zone at a temperature of from about −20° C. to about 0° C., thereby extracting ethylene oxide and catalyst-poisoning impurities from said reaction products in said scrubbing zone, withdrawing liquid comprising methyl alcohol containing dissolved ethylene oxide and catalyst poisoning impurities from said scrubbing zone, and distilling said liquid comprising methyl alcohol and ethylene oxide to separate ethylene oxide therefrom.

6. In a process for the production of olefin oxide wherein an olefin in admixture with paraffin is contacted with an oxygen-containing gas in the presence of an oxidation catalyst at a temperature of from about 100° C. to about 500° C., thereby effecting the direct catalytic oxidation of said olefin to olefin oxide with the formation of reaction products comprising olefin oxide, olefin, paraffins, oxygen and catalyst-poisoning impurities, the steps which comprise contacting said reaction products with a lower aliphatic alcohol in a scrubbing zone under conditions such as to inhibit any substantial amount of reaction between the olefin oxide and the lower aliphatic alcohol, thereby extracting olefin oxide and catalyst-poisoning impurities from said reaction products in said scrubbing zone, withdrawing liquid comprising aliphatic alcohol containing dissolved olefin oxide from said scrubbing zone, and distilling said liquid comprising aliphatic alcohol and olefin oxide to separate olefin oxide therefrom.

INGOLFUR BERGSTEINSSON.
JAMES R. SCHEIBLI.

REFERENCES CITED

The following references are of record in the file of this patent:

UNITED STATES PATENTS

| Number | Name | Date |
|---|---|---|
| 1,875,311 | Voorhees | Aug. 30, 1932 |
| 1,895,517 | Lewis | Jan. 31, 1933 |
| 2,135,271 | Balcar | Nov. 1, 1938 |
| 2,177,361 | Carter | Oct. 24, 1939 |
| 2,224,849 | Groll et al. | Dec. 17, 1940 |
| 2,241,019 | Metzger | May 6, 1941 |
| 2,248,635 | Marple | July 8, 1941 |
| 2,325,576 | Balcar | July 27, 1943 |

FOREIGN PATENTS

| Number | Country | Date |
|---|---|---|
| 397,161 | Great Britain | Aug. 3, 1933 |